J. E. Buxton,
Seed Dropper.

No. 92,262. Patented July 6, 1869.

Witnesses
Hinchman
J. N. Maber

Inventor
J. E. Buxton
per Munn & Co.
Attorneys

United States Patent Office.

JOHN E. BUXTON, OF OWATONNA, MINNESOTA.

Letters Patent No. 92,262, dated July 6, 1869.

IMPROVEMENT IN COMBINED DRILL AND SEEDER.

The Schedule referred to in these Letters Patent and making part of the same.

*To all whom it may concern:*

Be it known that I, JOHN E. BUXTON, of Owatonna, in the county of Steele, and State of Minnesota, have invented a new and improved Combined Drill and Seeder; and I do hereby declare that the following is a full, clear, and exact description thereof, which will enable others skilled in the art to make and use the same, reference being had to the accompanying drawing, forming part of this specification, in which—

Figure 1:
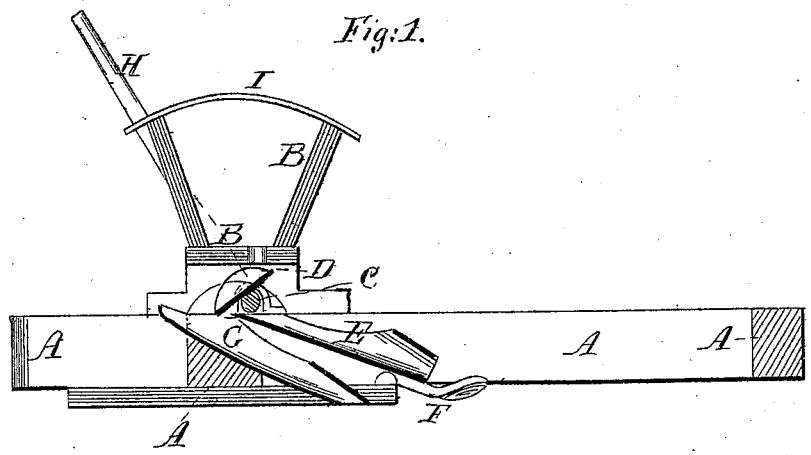
Figure 2:
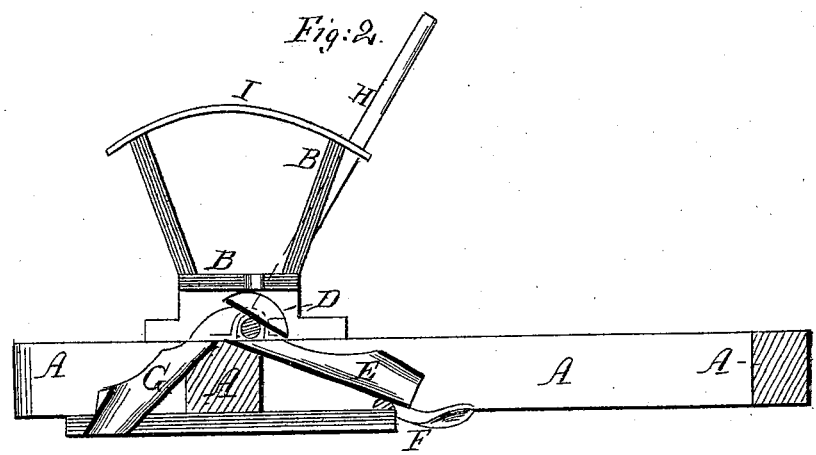

Figures 1 and 2 are detail vertical longitudinal sections of my improved machine.

Similar letters of reference indicate corresponding parts.

My invention has for its object to furnish a simple and convenient machine, which shall be so constructed and arranged that it may be quickly and conveniently adjusted to operate as a drill or as a broadcast-seeder, as may be desired, even while the machine is in motion; and It consists in the construction and combination of various parts of the machine, as hereinafter more fully described.

A represents the frame-work of the machine, to which the plows, hoes, or cultivator-teeth are attached in the ordinary manner, which plows are not shown in the drawings. The frame A may be mounted upon wheels or not, as may be desired or convenient.

B is the seed-hopper, which extends entirely across the machine from side to side. Holes are formed through the bottom of the hopper B, at such a distance apart as it is desired to have between the drills.

C is a rod, crossing the machine from side to side, directly beneath the hopper B, and working in bearings attached to the frame A.

To the rod C, directly beneath the holes in the bottom of the hopper B, are attached spouts D, open at both ends, as shown in figs. 1 and 2.

E are spouts inclining downward and forward, and which are securely attached to the frame A in such positions that their open upper ends may be directly beneath the forward part of the tilting-spouts D, so that when the said spouts are inclined forward, the seed, escaping from the holes in the bottom of the hopper B, may be guided into the spouts E.

F are the scatterers or spreaders, which are attached to the frame A in such positions as to be directly beneath and in front of the mouths of the spouts E, and which are so formed that the seed, as it flows from said spouts E, may strike against them, and be scattered in every direction, so as to be spread evenly over the ground.

G are spouts attached to the frame A in such positions that their upper ends may be directly beneath the rear ends of the tilting-spouts D, so that when the said spouts D are inclined to the rear, the seed from the hopper B may pass into the said spouts G. The spouts G incline downward, and may incline to the rear, as shown in fig. 2, or the front, as shown in fig. 1, according to the position of the plows by which the furrows are opened to receive the seeds.

To one end of the rod C is attached a lever, H, the upper end of which, when the spouts D are in a horizontal position, projects vertically upward, so that when the upper end of the lever H is moved forward, the spouts D may be inclined forward, to guide the seeds into the broadcast-seeder spouts E, and when the upper end of said lever is inclined rearward, the spouts D will be inclined to the rearward, to guide the seeds into the drill-spouts G.

I is a catch-bar or plate, having two notches, one at each end, formed in it, and which is attached to the end of the hopper B in such a position that the upper end of the lever H may catch in one or the other of the notches or teeth formed in said catch-bar I, to hold the tilting-spouts D securely in either position.

Having thus described my invention,

What I claim as new, and desire to secure by Letters Patent, is—

1. The tilting-spouts D and rod C, in combination with the perforated bottom of the hopper B, with the frame A, and with the spouts E and G, substantially as herein shown and described, and for the purpose set forth.

2. Providing a seeder with two sets of spouts, E and G, to adapt it for use as a drill or broadcast-seeder, substantially as herein shown and described, and for the purpose set forth.

3. The combination of the lever H and catch-bar I, with the bar C and tilting-spouts D, substantially as herein shown and described, and for the purpose set forth.

JOHN E. BUXTON.

Witnesses:
W. H. BURDICK,
BENJ. CHASE.